(12) United States Patent
Jee et al.

(10) Patent No.: US 10,100,153 B2
(45) Date of Patent: Oct. 16, 2018

(54) POLY(IMIDE-AMIDE) COPOLYMER, ARTICLE CONTAINING POLY(IMIDE-AMIDE) COPOLYMER, AND ELECTRONIC DEVICE INCLUDING SAME

(71) Applicants: SAMSUNG ELECTRONICS CO., LTD., Suwon-si, Gyeonggi-do (KR); Samsung SDI Co., Ltd., Yongin-si, Gyeonggi-do (KR)

(72) Inventors: Sang Soo Jee, Hwaseong-si (KR); Hyunjeong Jeon, Seoul (KR); Sungwon Choi, Hwaseong-si (KR); Byunghee Sohn, Yongin-si (KR); Kyeong-sik Ju, Suwon-si (KR)

(73) Assignees: SAMSUNG ELECTRONICS CO., LTD., Gyeonggi-Do (KR); SAMSUNG SDI CO., LTD., Gyeonggi-Do (KR)

( * ) Notice: Subject to any disclaimer, the term of this patent is extended or adjusted under 35 U.S.C. 154(b) by 0 days.

(21) Appl. No.: 15/291,603

(22) Filed: Oct. 12, 2016

(65) Prior Publication Data
US 2017/0101509 A1 Apr. 13, 2017

(30) Foreign Application Priority Data

Oct. 13, 2015 (KR) .................. 10-2015-0143063
Oct. 4, 2016 (KR) .................. 10-2016-0127429

(51) Int. Cl.
| | | |
|---|---|---|
| C08G 73/00 | (2006.01) | |
| C08G 73/14 | (2006.01) | |
| C08G 73/10 | (2006.01) | |
| C08J 5/18 | (2006.01) | |

(52) U.S. Cl.
CPC ......... *C08G 73/14* (2013.01); *C08G 73/1028* (2013.01); *C08G 73/1039* (2013.01); *C08G 73/1042* (2013.01); *C08G 73/1067* (2013.01); *C08J 5/18* (2013.01); *C08J 2379/08* (2013.01)

(58) Field of Classification Search
None
See application file for complete search history.

(56) References Cited

U.S. PATENT DOCUMENTS

| 8,623,968 B2 | 1/2014 | Cho et al. |
| 2012/0305484 A1 | 12/2012 | Freeman et al. |
| 2015/0057426 A1 | 2/2015 | Cho et al. |

FOREIGN PATENT DOCUMENTS

| EP | 2540760 A1 | 5/2012 |
| EP | 3002310 A1 | 10/2015 |
| JP | 2008-106083 A | 5/2008 |
| KR | 2011-0010008 A | 1/2011 |
| KR | 2012-0069382 A | 6/2012 |

OTHER PUBLICATIONS

European Search Report dated Mar. 10, 2017, issued for European Patent Application No. 16193244.7-1302.
Junichi Ishii et al. "Ultra-low-modulus Positive-type Photosensitive Polyimides (4). Improvement of Adhesion Strength with Copper Foil", Journal of Photopolymer Science and Technology, 2009, vol. 22, No. 3, pp. 417-422.

*Primary Examiner* — Ana L. Woodward
(74) *Attorney, Agent, or Firm* — Cantor Colburn LLP

(57) ABSTRACT

A poly(imide-amide) copolymer includes: an imide structural unit which is a reaction product of a first diamine and a dianhydride, and an amide structural unit which is a reaction product of a second diamine and a diacyl halide, wherein each of the first diamine and the second diamine includes 2,2'-bis-trifluoromethyl-4,4'-biphenyldiamine, and at least one of the first diamine and the second diamine further includes a compound represented by Chemical Formula 1, wherein the dianhydride includes 3,3',4,4'-biphenyltetracarboxylic dianhydride and 4,4'-hexafluoroisopropylidene diphthalic anhydride, wherein the diacyl halide includes terephthaloyl chloride (TPCl), and wherein an amount of the compound represented by Chemical Formula 1 is less than or equal to about 10 mole percent based on the total amount of the first diamine and the second diamine:

$$NH_2\text{-}A\text{-}NH_2 \qquad \text{Chemical Formula 1}$$

wherein in Chemical Formula 1, A is the same as described in the detailed description.

16 Claims, 7 Drawing Sheets

POLY(IMIDE-AMIDE) COPOLYMER, ARTICLE CONTAINING POLY(IMIDE-AMIDE) COPOLYMER, AND ELECTRONIC DEVICE INCLUDING SAME

CROSS-REFERENCE TO RELATED APPLICATIONS

This application claims priority to Korean Patent Application Nos. 10-2015-0143063 and 10-2016-0127429 filed in the Korean Intellectual Property Office on Oct. 13, 2015, and Oct. 4, 2016, respectively, and all the benefits accruing therefrom under 35 U.S.C. § 119, the contents of which are incorporated herein in their entirety by reference.

BACKGROUND

1. Field

A poly(imide-amide) copolymer, method for preparing a poly(imide-amide) copolymer, an article including poly(imide-amide) copolymer, and an electronic device including the article are disclosed.

2. Description of the Related Art

A structure of a flexible device includes a stack of various multi-layered films. For example, a transparent flexible display device includes a stack of multi-layers of an outmost hard coating layer, a transparent window substrate material, an adhesive, a polarization film, an adhesive, a light emission driver, and the like. The multi-layers are currently stacked and bonded using an adhesive film, and adherence of this adhesive film to a substrate material is an important factor for realizing reliability of a product in a flexibility evaluation and the like. Accordingly, an attempt to improve the reliability has been made by improving adherence characteristics of an adhesive, but since various substrate materials have their own different surface characteristics, there is a limit in developing an adhesive to realize excellent adherence to the substrate materials.

On the other hand, a transparent plastic film capable of replacing a window cover glass is required to satisfy high hardness and optical properties in order to be applied to a flexible display. The hardness may be complemented by coating a hard coating layer thereon, but herein, a base film having a high tensile modulus (hereinafter, referred to be a 'modulus') may contribute to increasing hardness of a final film. The optical properties may include high light transmittance, a low haze, a low yellowness index (YI), UV coloring resistance characteristics, and the like.

There remains a need for a film having high mechanical strength and excellent optical properties capable of providing good adherence with an adhesive.

SUMMARY

An embodiment provides a poly(imide-amide) copolymer having high mechanical strength and optical properties after a curing process, while enforcing adherence with an adhesive.

Another embodiment provides a method for preparing the poly(imide-amide) copolymer according to the embodiment.

Still another embodiment provides an article including the poly(imide-amide) copolymer according to the embodiment.

Yet another embodiment provides an electronic device including the article according to the embodiment.

A poly(imide-amide) copolymer according to an embodiment includes:

an imide structural unit which is a reaction product of a first diamine and a dianhydride, and an amide structural unit which is a reaction product of a second diamine and a diacyl halide, wherein each of the first diamine and the second diamine includes 2,2'-bis-trifluoromethyl-4,4'-biphenyldiamine, wherein at least one of the first diamine and the second diamine further includes a compound represented by Chemical Formula 1, wherein the dianhydride includes 3,3',4,4'-biphenyltetracarboxylic dianhydride and 4,4'-hexafluoroisopropylidene diphthalic anhydride, wherein the diacyl halide includes terephthaloyl chloride (TPCl), and wherein an amount of the compound represented by Chemical Formula 1 is less than or equal to about 10 mole percent based on the total moles of the first diamine and the second diamine:

$$NH_2\text{-}A\text{-}NH_2 \qquad \text{Chemical Formula 1}$$

In Chemical Formula 1,

A includes a substituted or unsubstituted C6 to C30 aromatic ring, wherein the aromatic ring is substituted with at least one hydroxyl group, wherein the aromatic ring is a single ring, a condensed ring system including two or more single rings fused, or a ring system including two or more aromatic rings wherein two or more single rings or two or more condensed ring systems are linked to each other by a single bond or a linking group selected from —O—, —S—, —C(=O)—, —C(=O)O—, —OC(=O)—, —OC(=O)O—, —CH(OH)—, —S(=O)$_2$—, —Si(CH$_3$)$_2$—, —(CH$_2$)$_p$— (wherein, 1≤p≤10), —(CF$_2$)$_q$— (wherein, 1≤q≤10), —CRR'— (wherein, R and R' are the same or different, and are independently hydrogen, a substituted or unsubstituted C1 to C10 aliphatic hydrocarbon group, a substituted or unsubstituted C6 to C20 aromatic hydrocarbon group, a substituted or unsubstituted C3 to C20 alicyclic hydrocarbon group, a substituted or unsubstituted C7 to C20 arylalkyl group, a substituted or unsubstituted C7 to C20 alkylaryl group, or a C1 to C4 alkyl group substituted with at least one halogen atom, wherein R and R' are optionally connected to form a ring, provided that R and R' are not simultaneously hydrogen), —C(=O)NH—, and a fluorenylene group.

A may be selected from chemical formulae of Group 1:

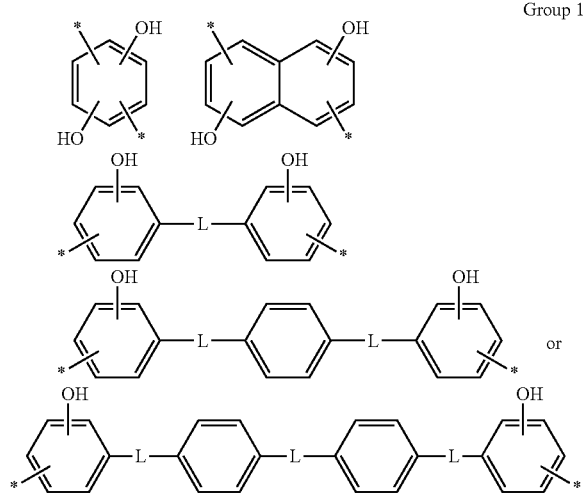

Group 1

In the chemical formulae,

L is a single bond or a linking group selected from —O—, —S—, —C(=O)—, —C(=O)O—, —OC(=O)—, —OC(=O)O—, —CH(OH)—, —S(=O)$_2$—, —Si(CH$_3$)$_2$—, —(CH$_2$)$_p$— (wherein, 1≤p≤10), —(CF$_2$)$_q$— (wherein, 1≤q≤10), —CRR'— (wherein, R and R' are the same or different, and are independently hydrogen, a C1 to C4 alkyl group, a phenyl group, a phenyl group substituted with a C1 to C4 alkyl group, a C1 to C4 alkyl group substituted with a phenyl group, or a C1 to C4 alkyl group substituted with at least one fluorine atom, wherein R and R' are optionally connected to form a ring, provided that R and R' are not simultaneously hydrogen), —C(=O)NH—, and a fluorenylene group, and

* is a portion linked to a nitrogen atom.

A may be represented by Chemical Formula 2 or Chemical Formula 3:

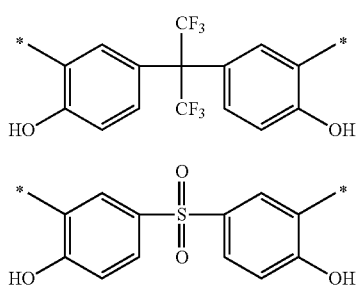

Chemical Formula 2

Chemical Formula 3

In Chemical Formulae 2 and 3,

* is a portion linked to a nitrogen atom.

The diamine represented by Chemical Formula 1 may be included in an amount of about 0.1 mole percent to about 8.0 mole percent based on the total amount of the first diamine and the second diamine of the poly(imide-amide) copolymer.

In the poly(imide-amide) copolymer, a mole ratio of the imide structural unit and the amide structural unit may be about 0.2 to 0.8:about 0.8 to 0.2.

In the poly(imide-amide) copolymer, a mole ratio of the imide structural unit and the amide structural unit may be about 0.2 to 0.4:about 0.8 to 0.6.

The poly(imide-amide) copolymer may include:

(i) a structural unit represented by Chemical Formula 4,
(ii) a structural unit represented by Chemical Formula 5,
(iii) a structural unit represented by Chemical Formula 6 and
(iv) at least one of a structural unit represented by Chemical Formula 7, a structural unit represented by Chemical Formula 8 and a structural unit represented by Chemical Formula 9, wherein the total amount of the (iv) at least one of the structural unit represented by Chemical Formula 7, the structural unit represented by Chemical Formula 8 and the structural unit represented by Chemical Formula 9 may be less than or equal to about 10 mole percent based on the total moles of the structural units (i) to (iv):

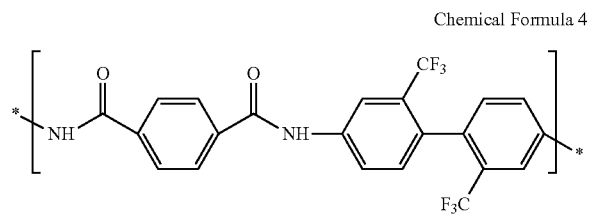

Chemical Formula 4

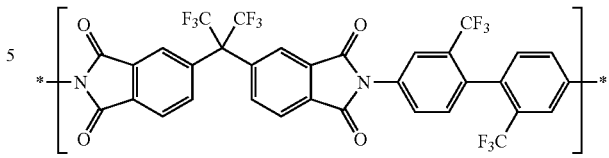

Chemical Formula 5

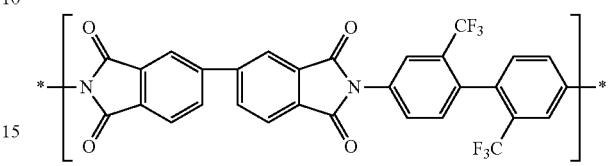

Chemical Formula 6

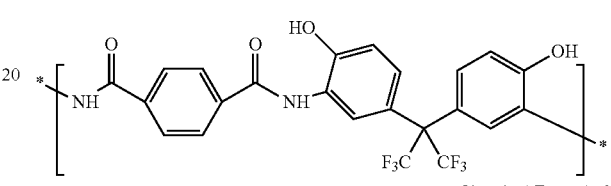

Chemical Formula 7

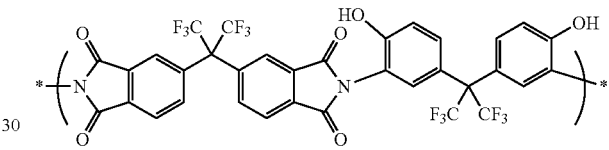

Chemical Formula 8

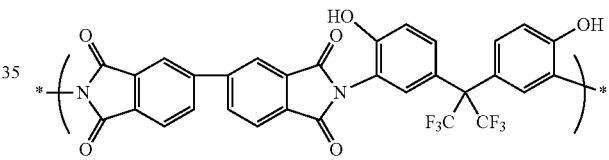

Chemical Formula 9

In Chemical Formulae 4 to 9,

* is a portion linked to a nitrogen atom or a carbon atom.

The poly(imide-amide) copolymer may include:

(i) the structural unit represented by Chemical Formula 4,
(ii) the structural unit represented by Chemical Formula 5,
(iii) the structural unit represented by Chemical Formula 6, and
(iv) at least one of the structural unit represented by Chemical Formula 8 and the structural unit represented by Chemical Formula 9, wherein the total amount of the (iv) at least one of the structural unit represented by Chemical Formula 8 and the structural unit represented by Chemical Formula 9 may be about 0.1 mole percent to about 8.0 mole percent based on the total moles of the structural units (i) to (iv).

A poly(imide-amide) copolymer according to another embodiment may be a reaction product of a compound represented by Chemical Formula 10, a diamine represented by Chemical Formula 1 and a dianhydride including BPDA and 6FDA, and wherein an amount of the diamine represented by Chemical Formula 1 may be less than or equal to about 10 mole percent based on the total moles of a structural unit derived from TFDB in the compound represented by Chemical Formula 10 and the diamine represented by Chemical Formula 1:

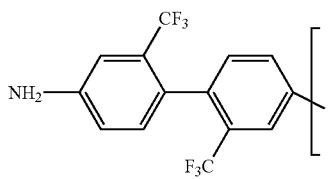 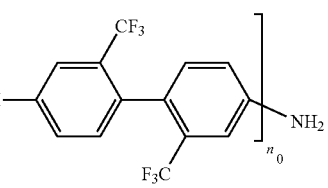

Chemical Formula 10

In Chemical Formula 10, $n_0$ is an integer of 0 or more.

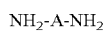

Chemical Formula 1

In Chemical Formula 1,

A includes a substituted or unsubstituted C6 to C30 aromatic ring, wherein the aromatic ring is substituted with at least one hydroxyl group, wherein the aromatic ring is a single ring, a condensed ring system including two or more single rings fused, or a ring system including two or more aromatic rings wherein two or more single rings or two or more condensed ring systems are linked to each other by a single bond or a linking group selected from —O—, —S—, —C(=O)—, —C(=O)O—, —OC(=O)—, —OC(=O)O—, —CH(OH)—, —S(=O)$_2$—, —Si(CH$_3$)$_2$—, —(CH$_2$)$_p$— (wherein, 1≤p≤10), —(CF$_2$)$_q$— (wherein, 1≤q≤10), —CRR'— (wherein, R and R' are the same or different, and are independently hydrogen, a substituted or unsubstituted C1 to C10 aliphatic hydrocarbon group, a substituted or unsubstituted C6 to C20 aromatic hydrocarbon group, a substituted or unsubstituted C3 to C20 alicyclic hydrocarbon group, a substituted or unsubstituted C7 to C20 arylalkyl group, a substituted or unsubstituted C7 to C20 alkylaryl group, or a C1 to C4 alkyl group substituted with at least one halogen atom, wherein R and R' are optionally connected to form a ring, provided that R and R' are not simultaneously hydrogen), —C(=O)NH—, and a fluorenylene group.

A may be selected from chemical formulae of Group 1:

Group 1

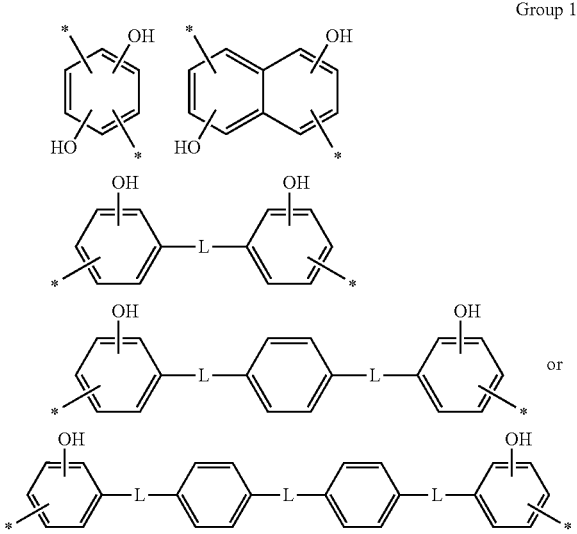

In the chemical formulae,

L is a single bond or a linking group selected from —O—, —S—, —C(=O)—, —C(=O)O—, —OC(=O)—, —OC(=O)O—, —CH(OH)—, —S(=O)$_2$—, —Si(CH$_3$)$_2$—, —(CH$_2$)$_p$— (wherein, 1≤p≤10), —(CF$_2$)$_q$— (wherein, 1≤q≤10), —CRR'— (wherein, R and R' are the same or different, and are independently hydrogen, a C1 to C4 alkyl group, a phenyl group, a phenyl group substituted with a C1 to C4 alkyl group, a C1 to C4 alkyl group substituted with a phenyl group, or a C1 to C4 alkyl group substituted with at least one fluorine atom, wherein R and R' are optionally connected to form a ring, provided that R and R' are not simultaneously hydrogen), —C(=O)NH—, and a fluorenylene group, and

* is a portion linked to a nitrogen atom.

A may be represented by Chemical Formula 2 or Chemical Formula 3:

Chemical Formula 2

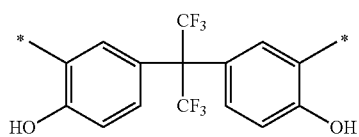

Chemical Formula 3

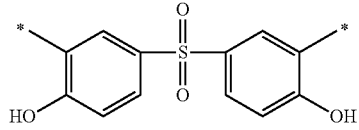

In Chemical Formulae 2 and 3,

* is a portion linked to a nitrogen atom.

A method of preparing a poly(imide-amide) copolymer according to an embodiment includes:

reacting TFDB with TPCl to prepare a compound represented by Chemical Formula 10, and reacting the prepared compound of Chemical Formula 10 with a diamine represented by Chemical Formula 1, 3,3',4,4'-biphenyltetracarboxylic dianhydride and 4,4'-hexafluoroisopropylidene diphthalic anhydride to prepare a poly(amic acid-amide) copolymer:

Chemical Formula 10

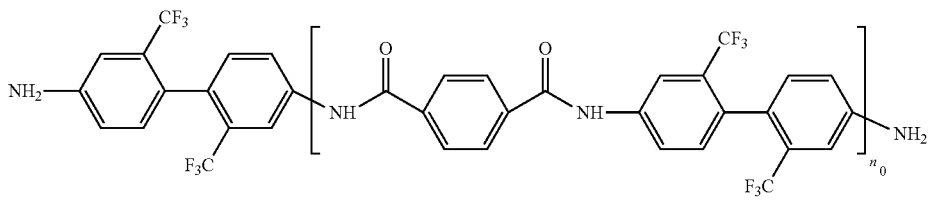

In Chemical Formula 10, $n_0$ is an integer of 0 or more.

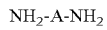          Chemical Formula 1

$NH_2$-A-$NH_2$

In Chemical Formula 1,

A includes a substituted or unsubstituted C6 to C30 aromatic ring, wherein the aromatic ring is substituted with at least one hydroxyl group, wherein the aromatic ring is a single ring, a condensed ring system including two or more single rings fused, or a ring system including two or more aromatic rings wherein two or more single rings or two or more condensed ring systems are linked to each other by a single bond or a linking group selected from —O—, —S—, —C(=O)—, —C(=O)O—, —OC(=O)—, —OC(=O)O—, —CH(OH)—, —S(=O)$_2$—, —Si(CH$_3$)$_2$—, —(CH$_2$)$_p$— (wherein, 1≤p≤10), —(CF$_2$)$_q$— (wherein, 1≤q≤10), —CRR'— (wherein, R and R' are the same or different, and are independently hydrogen, a substituted or unsubstituted C1 to C10 aliphatic hydrocarbon group, a substituted or unsubstituted C6 to C20 aromatic hydrocarbon group, a substituted or unsubstituted C3 to C20 alicyclic hydrocarbon group, a substituted or unsubstituted C7 to C20 arylalkyl group, a substituted or unsubstituted C7 to C20 alkylaryl group, or a C1 to C4 alkyl group substituted with at least one halogen atom, wherein R and R' are optionally connected to form a ring, provided that R and R' are not simultaneously hydrogen), —C(=O)NH—, and a fluorenylene group.

In the method of preparing the poly(imide-amide) copolymer, the diamine represented by Chemical Formula 1 may be reacted in an amount of less than or equal to about 10 mole percent based on the total moles of 2,2'-bis-trifluoromethyl-4,4'-biphenyldiamine and the diamine represented by Chemical Formula 1.

A may be selected from chemical formulae of Group 1:

Group 1

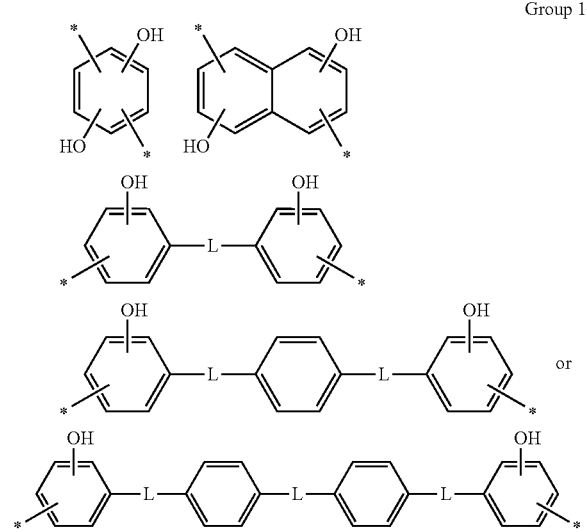

In the chemical formulae,

L is a single bond or a linking group selected from —O—, —S—, —C(=O)—, —C(=O)O—, —OC(=O)—, —OC(=O)O—, —CH(OH)—, —S(=O)$_2$—, —Si(CH$_3$)$_2$—, —(CH$_2$)$_p$— (wherein, 1≤p≤10), —(CF$_2$)$_q$— (wherein, 1≤q≤10), —CRR'— (wherein, R and R' are the same or different, and are independently hydrogen, a C1 to C4 alkyl group, a phenyl group, a phenyl group substituted with a C1 to C4 alkyl group, a C1 to C4 alkyl group substituted with a phenyl group, or a C1 to C4 alkyl group substituted with at least one fluorine atom, wherein R and R' are optionally connected to form a ring, provided that R and R' are not simultaneously hydrogen), —C(=O)NH—, and a fluorenylene group, and

* is a portion linked to a nitrogen atom.

A may be represented by Chemical Formula 2 or Chemical Formula 3:

Chemical Formula 2

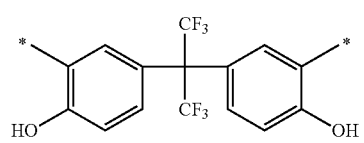

Chemical Formula 3

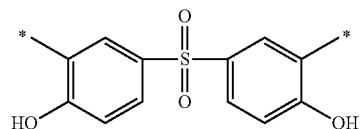

In Chemical Formulae 2 and 3,

* is a portion linked to a nitrogen atom.

The method of preparing the poly(imide-amide) copolymer may further include imidizing the poly(amic acid-amide) copolymer to prepare the poly(imide-amide) copolymer.

The imidizing may include chemical imidizing, thermal imidizing, or a combination thereof.

An article according to another embodiment may include the poly(imide-amide) copolymer according to the embodiment.

The article may be a film, and the film may have a yellowness index of less than or equal to 3.5 and a tensile modulus of greater than or equal to 4.0 gigapascals at a thickness of about 50 micrometers to about 100 micrometers.

An electronic device according to another embodiment includes the article according to the embodiment.

BRIEF DESCRIPTION OF THE DRAWINGS

The above and other aspects, advantages and features of this disclosure will become more apparent by describing in further detail exemplary embodiments thereof with reference to the accompanying drawings, in which.

DETAILED DESCRIPTION

Figure 1:
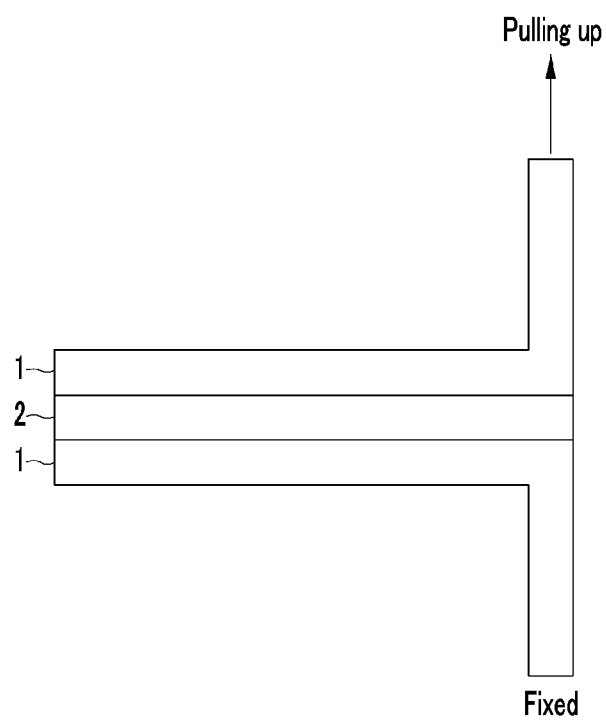
FIG. 1 is a view schematically showing a method of testing adherence between films 1 and an adhesive (PSA) 2.

This disclosure will be described more fully hereinafter with reference to the accompanying drawings, in which embodiments are shown. This disclosure may, however, be embodied in many different forms and is not to be construed as limited to the exemplary embodiments set forth herein.

Accordingly, the embodiments are merely described below, by referring to the figures, to explain aspects of the present description. As used herein, the term "and/or" includes any and all combinations of one or more of the associated listed items. The term "or" means "and/or." Expressions such as "at least one of" when preceding a list of elements, modify the entire list of elements and do not modify the individual elements of the list.

It will be understood that when an element is referred to as being "on" another element, it may be directly on the other element or intervening elements may be present therebetween. In contrast, when an element is referred to as being "directly on" another element, there are no intervening elements present.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer, or section. Thus, a first element, component, region, layer, or section discussed below could be termed a second element, component, region, layer, or section without departing from the teachings of the present embodiments.

The terminology used herein is for the purpose of describing particular embodiments only and is not intended to be limiting. As used herein, the singular forms "a," "an" and "the" are intended to include the plural forms as well, unless the context clearly indicates otherwise. The term "or" means "and/or." As used herein, the term "and/or" includes any and all combinations of one or more of the associated listed items. Expressions such as "at least one of," when preceding a list of elements, modify the entire list of elements and do not modify the individual elements of the list.

It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system).

Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

"Mixture" as used herein is inclusive of all types of combinations, including blends, alloys, solutions, and the like.

As used herein, when a specific definition is not otherwise provided, the term "substituted" refers to a functional group substituted with at least one substituent selected from a halogen atom (F, Br, Cl or I), a hydroxy group, a nitro group, a cyano group, an amino group ($—NH_2$, $—NH(R^{100})$ or $—N(R^{101})(R^{102})$, wherein $R^{100}$, $R^{101}$, and $R^{102}$ are the same or different, and are independently a C1 to C10 alkyl group), an amidino group, a hydrazine group, a hydrazone group, a carboxyl group, an ester group, a ketone group, a substituted or unsubstituted alkyl group, a substituted or unsubstituted alicyclic organic group, a substituted or unsubstituted aryl group, a substituted or unsubstituted alkenyl group, a substituted or unsubstituted alkynyl group, a substituted or unsubstituted heteroaryl group, and a substituted or unsubstituted heterocyclic group, in place of at least one hydrogen of a functional group, or the substituents may be linked to each other to provide a ring.

As used herein, when specific definition is not otherwise provided, the term "alkyl group" refers to a C1 to C30 alkyl group, and specifically a C1 to C15 alkyl group, the term "cycloalkyl group" refers to a C3 to C30 cycloalkyl group, and specifically a C3 to C18 cycloalkyl group, the term "alkoxy group" refers to a C1 to C30 alkoxy group, and specifically a C1 to C18 alkoxy group, the term "ester group" refers to a C2 to C30 ester group, and specifically a C2 to C18 ester group, the term "ketone group" refers to a C2 to C30 ketone group, and specifically C2 to C18 ketone group, the term "aryl group" refers to a C6 to C30 aryl group, and specifically C6 to C18 aryl group, the term "alkenyl group" refers to a C2 to C30 alkenyl group, and specifically a C2 to C18 alkenyl group, the term "alkynyl group" refers to a C2 to C30 alkynyl group, and specifically a C2 to C18 alkynyl group, the term "alkylene group" refers to a C1 to C30 alkylene group, and specifically a C1 to C18 alkylene group, and the term "arylene group" refers to a C6 to C30 arylene group, and specifically a C6 to C16 arylene group.

As used herein, when specific definition is not otherwise provided, the term "aliphatic organic group" refers to a C1 to C30 alkyl group, a C2 to C30 alkenyl group, a C2 to C30 alkynyl group, a C1 to C30 alkylene group, a C2 to C30 alkenylene group, or a C2 to C30 alkynylene group, and specifically a C1 to C15 alkyl group, a C2 to C15 alkenyl group, a C2 to C15 alkynyl group, a C1 to C15 alkylene group, a C2 to C15 alkenylene group, or a C2 to C15 alkynylene group, the term "alicyclic organic group" refers to a C3 to C30 cycloalkyl group, a C3 to C30 cycloalkenyl group, a C3 to C30 cycloalkynyl group, a C3 to C30 cycloalkylene group, a C3 to C30 cycloalkenylene group, or a C3 to C30 cycloalkynylene group, and specifically a C3 to C15 cycloalkyl group, a C3 to C15 cycloalkenyl group, a C3 to C15 cycloalkynyl group, a C3 to C15 cycloalkylene group, a C3 to C15 cycloalkenylene group, or a C3 to C15 cycloalkynylene group, the term "aromatic organic group" refers to a C6 to C30 group, for example, a C6 to C30 aryl group, or a C6 to C30 arylene group, and specifically a C6 to C16 aryl group, or a C6 to C16 arylene group such as a phenylene group including a single aromatic ring, a condensed ring including two or more aromatic rings, or two or more aromatic rings linked by a single bond or a fluorenylene group, a functional group selected from —O—, —S—, —C(═O)—, —C(═O)O—, —OC(═O)—, —OC(═O)O—, —CH(OH)—, —S(═O)$_2$—, —Si(CH$_3$)$_2$—, —(CH$_2$)$_p$— (wherein, 1≤p≤10), —(CF$_2$)$_q$— (wherein, 1≤q≤10), —C(CH$_3$)$_2$—, —C(CF$_3$)$_2$—, and —C(═O)NH—, for example, —S(═O)$_2$—, and the term "hetero cyclic group" refers to a C2 to C30 cycloalkyl group, a C2 to C30 cycloalkylene group, a C2 to C30 cycloalkenyl group, a C2 to C30 cycloalkenylene group, a C2 to C30 cycloalkynyl group, a C2 to C30 cycloalkynylene group, a C2 to C30 heteroaryl group, or a C2 to C30 heteroarylene group including 1 to 3 heteroatoms selected from O, S, N, P, Si, and a combination thereof in one ring, and specifically a C2 to C15 cycloalkyl group, a C2 to C15 cycloalkylene group, a C2 to C15 cycloalkenyl group, C2 to C15 cycloalkenylene group, a C2 to C15 cycloalkynyl group, a C2 to C15 cycloalkynylene group, a C2 to C15 heteroaryl group, or a C2 to C15 heteroarylene group including 1 to 3 heteroatoms selected from O, S, N, P, Si, and a combination thereof in one ring.

As used herein, when a definition is not otherwise provided, the term "alkyl" indicates a group derived from a completely saturated, branched or unbranched (or a straight or linear) hydrocarbon and having a specified number of carbon atoms.

As used herein, when a definition is not otherwise provided, the term "aryl" indicates an aromatic hydrocarbon containing at least one ring and having the specified number of carbon atoms.

As used herein, when a definition is not otherwise provided, the term "arylalkyl" indicates an alkyl group substituted with an aryl group, wherein the terms "alkyl" and "aryl" have the same meaning as described above.

As used herein, when a definition is not otherwise provided, the term "alkylaryl" indicates an aryl group substituted with an alkyl group, wherein the terms "aryl" and "alkyl" have the same meaning as described above.

When a group containing a specified number of carbon atoms is substituted with any of the groups listed in the preceding paragraph, the number of carbon atoms in the resulting "substituted" group is defined as the sum of the carbon atoms contained in the original (unsubstituted) group and the carbon atoms (if any) contained in the substituent. For example, when the term "substituted C1 to C30 alkyl" refers to a C1 to C30 alkyl group substituted with C6 to C30 aryl group, the total number of carbon atoms in the resulting aryl substituted alkyl group is C7 to C60.

As used herein, when a definition is not otherwise provided, "combination" commonly refers to mixing or copolymerization.

In addition, in the specification, "*" may refer to a point of attachment to nitrogen or another atom.

The same material or the same elements in the drawings are provided with the same reference number. For better understanding and ease of description, sizes of each element of the drawings may be exaggerated in the drawings, so may be larger or smaller than actual sizes.

A poly(imide-amide) copolymer according to an embodiment includes:

an imide structural unit which is a reaction product of a first diamine and a dianhydride, and an amide structural unit which is a reaction product of a second diamine and diacyl halide, wherein each of the first diamine and the second diamine includes 2,2'-bis-trifluoromethyl-4,4'-biphenyldiamine (TFDB) which may be substituted or unsubstituted, wherein at least one of the first diamine and the second diamine further includes a compound represented by Chemical Formula 1, wherein the dianhydride includes 3,3',4,4'-biphenyltetracarboxylic dianhydride (BPDA) and 4,4'-hexafluoroisopropylidene diphthalic anhydride (6FDA) each of which may be substituted or unsubstituted, wherein the diacyl halide includes terephthaloyl chloride (TPCl) which may be substituted or unsubstituted, and wherein the compound represented by Chemical Formula 1 is included in an amount of less than or equal to about 10 mole percent (mol %) based on the total moles of the diamine:

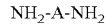   Chemical Formula 1

In Chemical Formula 1,

A is a substituted or unsubstituted C6 to C30 aromatic ring substituted with at least one hydroxyl group, wherein the aromatic ring is a single ring, a condensed ring system including two or more single rings fused, or a ring system including two or more aromatic rings wherein two or more single rings or two or more condensed ring systems are linked to each other by a single bond or a linking group selected from —O—, —S—, —O(=O)—, —C(=O)O—, —OC(=O)—, —OC(=O)O—, —CH(OH)—, —S(=O)$_2$—, —Si(CH$_3$)$_2$—, —(CH$_2$)$_p$— (wherein, 1≤p≤10), —(CF$_2$)$_q$— (wherein, 1≤q≤10), —CRR'— (wherein, R and R' are the same or different, and are independently hydrogen, a substituted or unsubstituted C1 to C10 aliphatic hydrocarbon group, a substituted or unsubstituted C6 to C20 aromatic hydrocarbon group, a substituted or unsubstituted C3 to C20 alicyclic hydrocarbon group, a substituted or unsubstituted C7 to C20 arylalkyl group, a substituted or unsubstituted C7 to C20 alkylaryl group, or a C1 to C4 alkyl group substituted with at least one halogen atom, wherein R and R' are optionally connected to form a ring, provided that R and R' are not simultaneously hydrogen), —C(=O)NH—, and a fluorenylene group.

For a substrate material of a flexible device, various synthetic polymer films such as polyethylene terephthalate, a polycarbonate, a polyimide, a polyamide, a polyester, a polycarbonate, polyvinyl chloride, polyethylene, polypropylene, polystyrene, polyvinyl alcohol, polyvinyl dichloride, polyvinyl acetate, a fluoropolymer such as polytetrafluoroethylene, or polydimethylsiloxane may be used. Of these, a polyimide having improved stability due to its mechanical and chemical properties in a wide temperature range has been actively investigated. In addition, in order to improve mechanical properties of a substrate, a poly(imide-amide) film including an amide structure unit has been attractive as a substrate material for a flexible device. A development of a flexible device, for example, a flexible display device using such a film having high hardness and high strength instead of a conventional glass substrate of electronic materials has been actively pursued.

As described above, a flexible device needs a stack of various films including a plurality of layers. Currently, such a stack and bonding of the layers thereof have been implemented using an adhesive film, and there is a need for improvement of adherence between films in order to decrease defects in a flexible device, for example, a bent portion during the use of a device. In order to improve the adherence, improvements of adhesion characteristics of an adhesive has been mainly studied, but there are limits for implementing adhesives having excellent adherence with all substrate materials, as surface characteristics of various substrate materials are different.

The inventors of the present application have developed a poly(imide-amide) copolymer that is used as a substrate material, for example, a transparent window substrate material having improved adherence with an adhesive, and thereby adherence and adhesion reliability may be improved even if a general adhesive is used, and optical properties and mechanical characteristics of the poly(imide-amide) copolymer as a novel substrate material are not deteriorated.

As described above, a poly(imide-amide) copolymer according to an embodiment includes:

an imide structural unit obtained from a first diamine and a dianhydride, and an amide structural unit obtained from a second diamine and a diacyl halide, wherein each of the first diamine and the second diamine constituting the imide structural unit and the amide structural unit includes TFDB, that is, 2,2'-bis-trifluoromethyl-4,4'-biphenyldiamine, and wherein at least one of the first diamine and the second diamine further includes the diamine compound represented by Chemical Formula 1, wherein the dianhydride includes 3,3',4,4'-biphenyltetracarboxylic dianhydride (BPDA) and 4,4'-hexafluoroisopropylidene diphthalic anhydride (6FDA), and wherein the diacyl halide includes terephthaloyl chloride (TPCl), and wherein the compound represented by Chemical Formula 1 is included in an amount of less than or equal to about 10 mol %, for example, about 0.1 mol % to about 10 mol %, or for example, about 1 mol % to about 8 mol %, based on the total moles of the first diamine and the second diamine.

That is, both the first and the second diamines include TFDB, and one or both of them further include the diamine represented by Chemical Formula 1, where the diamine represented by Chemical Formula 1 is included in an amount of less than or equal to about 10 mol % based on the total moles of the first diamine and the second diamine.

In an exemplary embodiment, the first diamine may include TFDB and the second diamine may include TFDB and the diamine compound represented by Chemical Formula 1. In another exemplary embodiment, the first diamine may include TFDB and the diamine compound represented by Chemical Formula 1 and the second diamine may include TFDB.

In yet another exemplary embodiment, the first diamine may include TFDB and the diamine compound represented by Chemical Formula 1 and the second diamine may include TFDB and the diamine compound represented by Chemical Formula 1.

The compound represented by Chemical Formula 1 includes a substituted or unsubstituted C6 to C30 aromatic ring, wherein the aromatic ring is substituted with at least one hydroxyl group, and wherein the aromatic ring includes a single ring, a condensed ring system including two or more single rings fused, or a ring system including two or more aromatic rings wherein two or more single rings or two or more condensed ring systems are linked to each other by a single bond or the specific linking groups that are described above.

The compound represented by Chemical Formula 1 includes at least one aromatic ring substituted with at least one hydroxyl group, which reacts with a dianhydride to provide the imide structural unit of the poly(imide-amide) copolymer or with a diacyl halide compound to provide the amide structural unit of the copolymer, and thus is included in the imide structural unit or the amide structural unit. Thereby, the poly(imide-amide) copolymer including the imide structural unit and the amide structural unit includes a polymer chain substituted with at least one hydroxyl group. When the poly(imide-amide) copolymer substituted with the at least one hydroxyl group is used as a high hardness window film, the at least one hydroxyl group forms a hydrogen bond with a hydrogen of an amino group, a carboxyl group, or a hydroxyl group of a conventional adhesive, or of a hard coating layer, applied to or coated on the window film. As a result, additional hydrogen bonds between the at least one hydroxyl group derived from the compound represented by Chemical Formula 1 and hydrogen atoms of the functional groups of the adhesion layer or the hard coating layer may be formed in addition to the hydrogen bonds between the amino groups that are basically included in the poly(imide-amide) copolymer chain and the hydrogen atoms of the functional groups of the adhesion layer or the hard coating layer. Accordingly, the poly(imide-amide) copolymer film may have further improved adherence with an adhesive or a hard coating layer thereon.

Therefore, the diamine represented by Chemical Formula 1 may include any diamine that has a moiety represented by group A of Chemical Formula 1, which includes a C6 to C30 aromatic ring substituted with at least one hydroxyl group, without particular limitation. For example, the C6 to C30 aromatic ring may have two or more hydroxyl groups, and for example, when the group A includes two or more aromatic rings, the hydroxyl groups may be located at the aromatic rings positioned at the terminal ends of a system containing two or more consecutively linked aromatic rings.

In an exemplary embodiment, the group A may be selected from chemical formulae of Group 1:

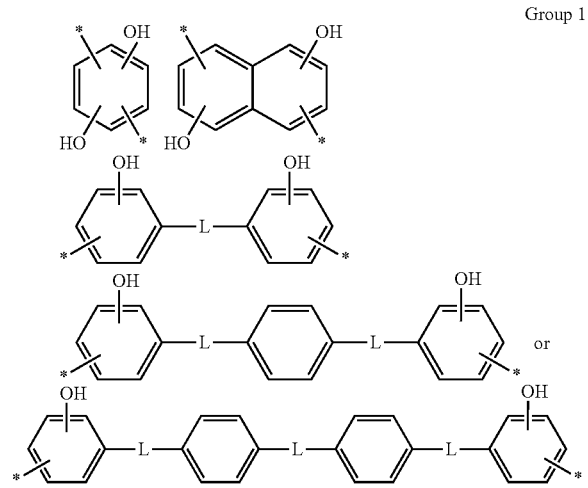

Group 1

In the chemical formulae,

L is a single bond or a linking group selected from —O—, —S—, —C(=O)—, —C(=O)O—, —OC(=O)—, —OC(=O)O—, —CH(OH)—, —S(=O)$_2$—, —Si(CH$_3$)$_2$—, —(CH$_2$)$_p$— (wherein, 1≤p≤10), —(CF$_2$)$_q$— (wherein, 1≤q≤10), —CRR'— (wherein, R and R' are the same or different, and are independently hydrogen, a C1 to C4 alkyl group, a phenyl group, a phenyl group substituted with a C1 to C4 alkyl group, a C1 to C4 alkyl group substituted with a phenyl group, or a C1 to C4 alkyl group substituted with at least one fluorine atom, wherein R and R' are optionally connected to form a ring, provided that R and R' are not simultaneously hydrogen), —C(=O)NH—, and a fluorenylene group, and

* is a portion linked to a nitrogen atom.

In the chemical formulae, each hydroxyl group may be positioned at an ortho position with respect to the position linked to the nitrogen atom.

In an exemplary embodiment, the group A may be represented by Chemical Formula 2 or Chemical Formula 3:

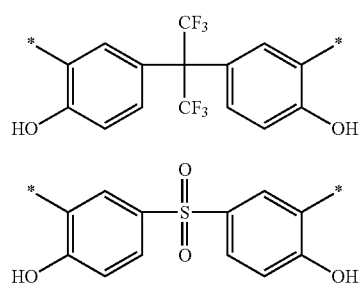

Chemical Formula 2

Chemical Formula 3

In Chemical Formulae 2 and 3, * is a portion linked to a nitrogen atom.

In an exemplary embodiment, the diamine represented by Chemical Formula 1 may be included in an amount of about 0.1 mol % to about 8.0 mol %, for example, in an amount of about 1 mol % to about 5.0 mol % based on the total moles of the diamines constituting the poly(imide-amide) copolymer. While not wishing to be bound by theory, it is understood that when the diamine represented by Chemical Formula 1 is included within the above ranges, adherence with the poly(imide-amide) copolymer may be improved compared with a poly(imide-amide) copolymer film that does not include a structural unit derived from the diamine represented by Chemical Formula 1, while excellent mechanical characteristics and optical properties of the poly(imide-amide) copolymer that does not include a structural unit derived from the diamine represented by Chemical Formula 1 may be maintained.

In an exemplary embodiment, the diamine represented by Chemical Formula 1 may be included in an amount of about 0.5 mol % to about 7.0 mol %, for example, about 0.5 mol % to about 2.0 mol %, based on the total moles of the diamine constituting the poly(imide-amide) copolymer. While not wishing to be bound by theory, it is understood that when the diamine represented by Chemical Formula 1 is included within the above ranges, adherence of the poly(imide-amide) copolymer as well as mechanical characteristic and optical properties may be improved.

In the poly(imide-amide) copolymer, the imide structural unit and the amide structural unit may be included in a mole ratio of about 0.2 to 0.8:about 0.8 to 0.2. For example, the imide structural unit and the amide structural unit may be included in a mole ratio of about 0.2 to 0.4:about 0.8 to 0.6. While not wishing to be bound by theory, it is understood that when the imide structural unit and the amide structural unit are included within the above ranges, optical properties and mechanical properties of the poly(imide-amide) copolymer may be maintained to be an improved level without deterioration.

The poly(imide-amide) copolymer includes:
(i) a structural unit represented by Chemical Formula 4,
(ii) a structural unit represented by Chemical Formula 5,
(iii) a structural unit represented by Chemical Formula 6 and
(iv) at least one of a structural unit represented by Chemical Formula 7, a structural unit represented by Chemical Formula, and a structural unit represented by Chemical Formula 9, wherein the total amount of the (iv) at least one of the structural unit represented by Chemical Formula 7, the structural unit represented by Chemical Formula 8, and the structural unit represented by Chemical Formula 9 may be less than or equal to about 10 mol % based on the total moles of the structural units (i) to (iv):

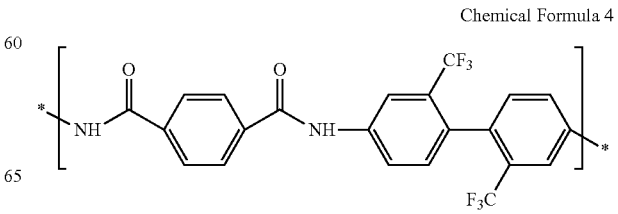

Chemical Formula 4

Chemical Formula 5

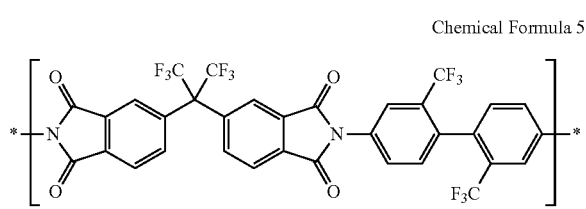

Chemical Formula 6

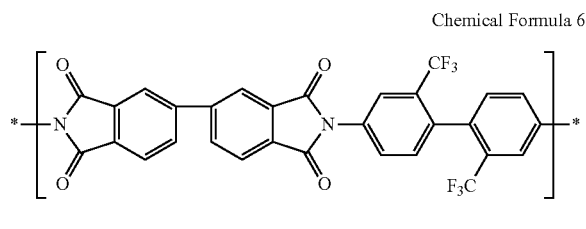

Chemical Formula 7

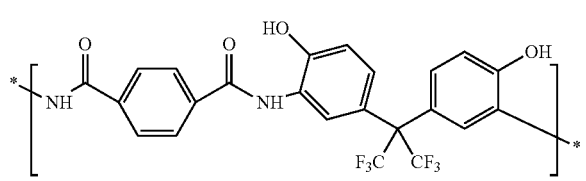

Chemical Formula 8

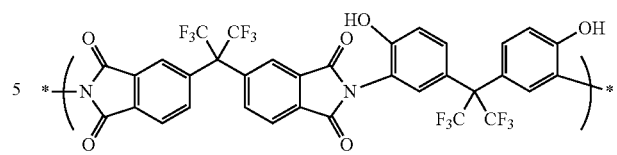

Chemical Formula 9

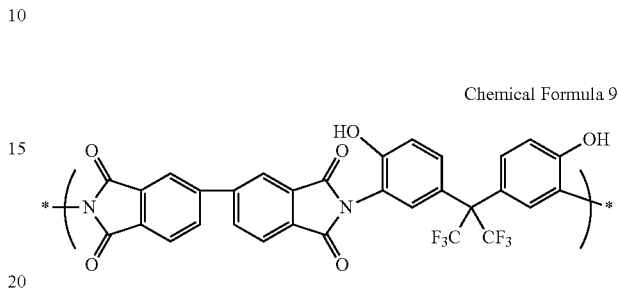

In Chemical Formulae 4 to 9, * is a portion linked to a nitrogen atom or a carbon atom.

The poly(imide-amide) copolymer includes:

(i) the structural unit represented by Chemical Formula 4, (ii) the structural unit represented by Chemical Formula 5, (iii) the structural unit represented by Chemical Formula 6, and (iv) at least one of the structural unit represented by Chemical Formula 8 and the structural unit represented by Chemical Formula 9, wherein the total amount of the (iv) at least one of the structural unit represented by Chemical Formula 8 and the structural unit represented by Chemical Formula 9 may be about 0.1 mol % to about 8.0 mol % based on the total moles of the structural units (i) to (iv).

A poly(imide-amide) copolymer according to another embodiment is a reaction product of a compound represented by Chemical Formula 10, a diamine represented by Chemical Formula 1, and a dianhydride including BPDA and 6FDA. During the reaction, the diamine represented by Chemical Formula 1 may be included in an amount of less than or equal to about 10 mol % based on the total moles of a structural unit derived from TFDB in the compound represented by Chemical Formula 10 and the diamine represented by Chemical Formula 1:

Chemical Formula 10

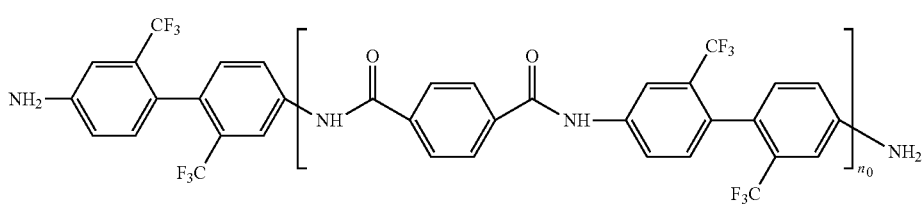

In Chemical Formula 10, $n_0$ is an integer of 0 or more.

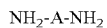
NH$_2$-A-NH$_2$  Chemical Formula 1

In Chemical Formula 1,

A may include a substituted or unsubstituted C6 to C30 aromatic ring, wherein the aromatic ring is substituted with at least one hydroxyl group, wherein the aromatic ring is a single ring, a condensed ring system including two or more single rings fused, or a ring system including two or more aromatic rings wherein two or more single rings or two or more condensed ring systems are linked to each other by a single bond or a linking group selected from —O—, —S—, —C(=O)—, —C(=O)O—, —OC(=O)—, —OC(=O)O—, —CH(OH)—, —S(=O)$_2$—, —Si(CH$_3$)$_2$—, —(CH$_2$)$_p$— (wherein, 1≤p≤10), —(CF$_2$)$_q$— (wherein, 1≤q≤10), —CRR'— (wherein, R and R' are the same or different, and are independently hydrogen, a substituted or unsubstituted C1 to C10 aliphatic hydrocarbon group, a substituted or unsubstituted C6 to C20 aromatic hydrocarbon group, a substituted or unsubstituted C3 to C20 alicyclic hydrocarbon group, a substituted or unsubstituted C7 to C20 arylalkyl group, a substituted or unsubstituted C7 to C20 alkylaryl group, or a C1 to C4 alkyl group substituted with at least one halogen atom, wherein R and R' are optionally connected to form a ring, provided that R and R' are not simultaneously hydrogen), —C(=O)NH—, and a fluorenylene group.

A conventional poly(imide-amide) copolymer is prepared by combining monomers providing an imide structural unit, for example, diamine (TFDB) and dianhydride (BPDA and/or 6FDA) and monomers providing an amide structural unit, for example, diamine (TFDB) and diacyl dichloride (TPCl) in one reactor followed by polymerization in a reaction solvent. Meanwhile, in an exemplary embodiment, the poly(imide-amide) copolymer may be prepared by first reacting monomers constituting an amide structural unit, for example, TFDB and TPCl to prepare an amide oligomer including amino groups at both terminal ends, adding the diamine represented by Chemical Formula 1 and a dianhydride, BPDA and 6FDA, to the prepared amide oligomer, followed by an additional reaction, and preparing a precursor of the poly(imide-amide) copolymer, a poly(amic acid-amide) copolymer.

Accordingly, a method of preparing a poly(imide-amide) copolymer according to an embodiment includes reacting TFDB with TPCl to prepare a compound represented by Chemical Formula 10, and reacting the prepared compound of Chemical Formula 10 with the diamine represented by Chemical Formula 1, BPDA and 6FDA:

at least one hydroxyl group, wherein the aromatic ring is a single ring, a condensed ring system including two or more single rings fused, or a ring system including two or more aromatic rings wherein two or more single rings or two or more condensed ring systems are linked to each other by a single bond or a linking group selected from —O—, —S—, —C(=O)—, —C(=O)O—, —OC(=O)—, —OC(=O)O—, —CH(OH)—, —S(=O)$_2$—, —Si(CH$_3$)$_2$—, —(CH$_2$)$_p$— (wherein, 1≤p≤10), —(CF$_2$)$_q$— (wherein, 1≤q≤10), —CRR'— (wherein, R and R' are the same or different, and are independently hydrogen, a substituted or unsubstituted C1 to C10 aliphatic hydrocarbon group, a substituted or unsubstituted C6 to C20 aromatic hydrocarbon group, a substituted or unsubstituted C3 to C20 alicyclic hydrocarbon group, a substituted or unsubstituted C7 to C20 arylalkyl group, a substituted or unsubstituted C7 to C20 alkylaryl group, or a C1 to C4 alkyl group substituted with at least one halogen atom, wherein R and R' are optionally connected to form a ring, provided that R and R' are not simultaneously hydrogen), —C(=O)NH—, and a fluorenylene group.

In the method of preparing the poly(imide-amide) copolymer, the diamine represented by Chemical Formula 1 may be reacted in an amount of less than or equal to about 10 mol % based on the total moles of TFDB and the diamine represented by Chemical Formula 1.

The compound represented by Chemical Formula 10 may be prepared by a general polyamide preparation method, for example, polymerization of TFDB and TPCl in an aprotic polar solvent.

The aprotic polar solvent may include a sulfoxide-based solvent such as dimethylsulfoxide and diethylsulfoxide, a formamide-based solvent such as N,N-dimethyl formamide and N,N-diethylformamide, an acetamide-based solvent such as N,N-dimethylacetamide and N,N-diethylacetamide, a pyrrolidone-based solvent such as N-methyl-2-pyrrolidone and N-vinyl-2-pyrrolidone, a phenol-based solvent such as phenol, o-, m-, or p-cresol, xylenol, halogenated phenol, and catechol, hexamethylphosphoramide, γ-butyrolactone, or a combination thereof. However, this disclosure is not limited thereto, and any aromatic hydrocarbon, such as xylene and toluene, may be used. Also, to promote the dissolution of a polymer, an alkali metal salt or an alkaline earth metal salt may be further added to the solvent in an amount of about 50 wt % or less based on the total amount of the solvent.

The prepared compound represented by Chemical Formula 10 may have a number average molecular weight of about 400 to about 2,500 Daltons, for example, about 800 to about 2,000 Daltons without limitation. The number average

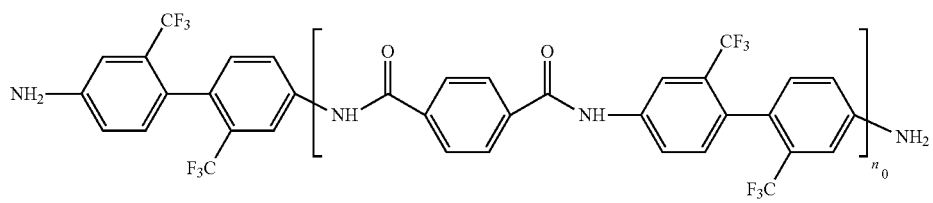

Chemical Formula 10

In Chemical Formula 10, $n_0$ is an integer of 0 or more.

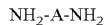
NH$_2$-A-NH$_2$  Chemical Formula 1

In Chemical Formula 1,

A includes a substituted or unsubstituted C6 to C30 aromatic ring, wherein the aromatic ring is substituted with molecular weight of the compound may be easily controlled by adjusting the amount of the reactants, TFDB and TPCl. By maintaining the molecular weight of the compound within the above range, it is easy to control the polymerization equivalent ratio or the polymerization viscosity during subsequent reactions with the dianhydride compound.

When $n_0$ of Chemical Formula 10 is 0, the compound represented by Chemical Formula 10 refers to unreacted TFDB that does not react with TPCl. Accordingly, after completion of the reaction for preparing the amide group-containing oligomer, the reaction product may include amide group-containing oligomers including amino groups at both terminal ends, as well as unreacted TFDB. To the reaction product, the diamine represented by Chemical Formula 1 and the dianhydrides, BPDA and 6FDA, are added and reacted to prepare a precursor of the poly(imide-amide) copolymer, a poly(amic acid-amide) copolymer. The preparation of the poly(amic acid-amide) copolymer may be performed by polymerization of the reactants in an aprotic polar solvent using a known imide preparation process.

Meanwhile, although only the compound represented by Chemical Formula 10, which is a reaction product of TFDB and TPCl, is described, persons skilled in the art could readily understand that the diamine represented by Chemical Formula 1 may also be added and reacted with TPCl, along with TFDB, to prepare an amide group-containing oligomer having a chemical formula that is similar to Chemical Formula 10.

The prepared poly(amic acid-amide) copolymer may be partially or completely imidized by chemical and/or thermal imidization processes to prepare a partially or completely imidized poly(imide-amide) copolymer.

The chemical imidization may include adding an imidization catalyst to the poly(amic acid-amide) copolymer, followed by agitating the resultant. In addition, the thermal imidization may include heating the prepared poly(amic acid-amide) copolymer at a predetermined temperature for a predetermined time.

The imidization catalyst may include any known catalyst in the related art without limitation, and may be, for example, acid anhydride such as acetic anhydride, isoquinoline, β-picoline, pyridine, an azole, a phosphine, malononitrile, 2,6-dimethylpiperidine, triethylamine, N,N,N',N'-tetramethylethyleneamine, triphenylphosphine, 4-dimethylaminopyridine, tripropylamine, tributylamine, N,N-dimethylbenzylamine, 1,2,4-triazole and triisobutylamine, and the like.

The imidization may be performed by combining chemical imidization with thermal imidization. For example, a dehydration agent and an imidization catalyst are added to a solution including poly(amic acid-amide) copolymer and heated to activate the dehydration agent and the imidization catalyst to perform partial imidization. The imidization may be performed at about 50° C. to about 400° C., for example, about 200° C. to about 400° C., for about 30 minutes or more, to achieve 90% or more of imidization.

The imidization catalyst may be added in a mole ratio of 1:1 or greater, for example, 1:3 or greater with respect to the polyamic acid. When the imidization catalyst is added in a more excessive amount than the amount of the polyamic acid, dehydration reaction may be effectively derived and imidization may be smoothly performed, at a lower temperature, which prevents color changes and thermal stability deterioration of the copolymer by a long-term reaction at a high temperature.

The partially or completely imidized poly(imide-amide) copolymer may be added in a solvent of water, methanol, or ethyl ether, and the like, having lower polarity than the polymerization solvent, and may then be precipitated in a solid form. The obtained solid poly(imide-amide) copolymer may be dissolved in a solvent again, casted on a support, and imidized to manufacture an article, such as a film and the like.

The article may be formed of the poly(imide-amide) copolymer through a dry-wet method, a dry method, or a wet method, but is not limited thereto.

When the article is a film, it may be manufactured using a solution including the poly(imide-amide) copolymer through the dry-wet method, where a layer is formed by extruding the solution of the poly(amide-imide) copolymer from a mouth piece on a supporter, such as drum or an endless belt, drying the layer, and evaporating the solvent from the layer until the layer has a self-maintenance property. The drying may be performed, for example, at about 25° C. to about 300° C., for about 1 hour or less. When the surface of the drum and/or the endless belt used for the drying process becomes flat, a layer with a flat surface is formed. The layer obtained after the drying process is delaminated from the supporter, and subjected to a wet process, desalted, and/or desolventized. The manufacturing of the film is completed after the layer is elongated, dried, and/or heat treated.

The elongating may be performed at an elongation ratio in terms of surface ratio, which may range from about 0.8 to about 8, for example, about 1.3 to about 8. As used herein, the term "surface ratio" refers to a value obtained by dividing the area of a layer after the elongating, by an area of the layer before the elongating. A value of 1 or less denotes a relaxed state. On the other hand, the elongating may be performed not only in a surface direction but also at a thickness direction.

The heat treatment may be performed at a temperature of about 200° C. to about 500° C., for example at about 250° C. to about 400° C., for several seconds to about several minutes.

Also, the layer after elongating and heat treatment may be cooled slowly, for example, at a speed of about 50 degrees Centigrade per second (° C./second) or lower.

The layer may be formed as a single layer or as multiple layers.

The article may be a film, and the film may have a yellowness index (YI) of less than or equal to 3.5 at a thickness of about 50 micrometers (μm) to about 100 micrometers, for example, at about 50 micrometers, according to ASTM D1926.

The article may be a film, and the film may have a tensile modulus of greater than or equal to 4.0 gigapascals (GPa) at a thickness of about 50 μm to about 100 μm, for example, at about 50 μm, according to ASTM D882.

That is, the article may maintain excellent optical properties of the poly(imide-amide) copolymer, for example, a low yellowness index (YI) and a high tensile modulus, and may improve adherence with a conventional adhesive, which will be evidenced by the Examples.

Accordingly, the article according to the embodiment may be advantageously applied to a flexible device, for example, a flexible display device that may be manufactured by stacking multi-layered films.

In the flexible display device, the poly(imide-amide) copolymer according to the embodiment may be used as a window film due to high mechanical characteristics and optical properties, but this disclosure is not limited thereto, and the poly(imide-amide) copolymer may be applied to various substrate materials in a flexible device. When the poly(imide-amide) copolymer film according to the embodiment is used as a window substrate, adherence between a hard coating layer coated on the window substrate upper, or a transparent adhesive film under a window film, and the window substrate may be further improved.

An adhesive that may be used with the poly(imide-amide) copolymer film according to the embodiment and may improve adherence in a device including these may be various known adhesives used during manufacture of a flexible device, or a flexible display device, and useable adhesives may be a photocurable polyacrylate-based adhesive film, Optically clear adhesive 8146 of 3M, but are not particularly limited thereto.

Hereinafter, this disclosure is described in detail with reference to examples. The following examples and comparative examples are not restrictive but are illustrative.

EXAMPLES

Synthesis Example: Preparation of Amide Group-Containing Oligomer 0.312 moles (mol) (100 grams, g) of 2,2'-bis(trifluoromethyl)benzidine (TFDB) and 0.8744 mol (69.16 g) of pyridine are dissolved in 1,942.38 g of N,N-dimethyl acetamide (DMAc) as a solvent in a round-bottomed flask, and 100 g of DMAC was further added to the flask to dissolve the remaining TFDB. 0.2186 mol (44.38 g) of terephthaloyl chloride (TPCl) is divided into 10 portions, which are individually added, each portion at a time (a total of ten times), to be mixed with the TFDB solution in DMAC at room temperature. The mixture is then vigorously stirred and reacted for 2 hours at room temperature.

The resultant solution is further stirred under a nitrogen atmosphere for 2 hours, and then added to 14.2 liters (L) of water containing 710 g of NaCl. Then, the mixture is stirred for 10 minutes. Subsequently, a solid produced therein is filtered, re-suspended twice, and then re-filtered by using 10 L of deionized water. Then, the water remaining in the final product on the filter is removed as much as possible by thoroughly pressing the filtered precipitate on a filter, and then the precipitate is dried at 80° C. under vacuum, to obtain a compound (an amide group-containing oligomer and TFDB) represented by Chemical Formula 10 as a product.

N,N-dimethyl acetamide (DMAc) is further added to the solution, such that the total solid content becomes 16 percent by weight (wt %), to manufacture a poly(amic acid-amide) copolymer.

When the reaction is complete, 0.0439 mole of acetic anhydride is added thereto, and the mixture is stirred for 30 minutes. Then, the same number of moles of pyridine are added thereto, and the obtained mixture is further stirred at 30° C. for 36 hours to carry out a chemical imidization. After the chemical imidization, the resultant is converted into powder through precipitation. The powder is vacuum-dried at 120° C. for 24 hours and redissolved in N,N-dimethyl acetamide, to prepare a poly(imide-amide) copolymer solution.

The poly(imide-amide) copolymer solution is used to form a film on a glass plate by using a doctor blade. The film is pre-baked on an 80° C. hot plate for 1 hour, heated up to 250° C. at 3 degrees Centigrade per minute (° C./min) in a furnace, dried, and thermally imidized.

Example 1: Manufacture of Poly(Imide-Amide) Copolymer Film Including 0.5 mol % of Bis-APAF A poly(imide-amide) copolymer including 0.5 mol % of bis-APAF and a film formed therefrom are manufactured by using 99.5 mol % of the compound represented by Chemical Formula 10 according to Synthesis Example and 0.5 mol % of the bis-APAF ((2,2'-bis(3-amino-4-hydroxyphenyl)-hexafluoropropane) as a diamine moiety based on the total moles of the diamines.

Specifically, 120 g of N,N-dimethyl acetamide (DMAc) is placed in a reactor under a nitrogen atmosphere, and 0.0147 mol (20.25 g) of the amide group-containing oligomer represented by Chemical Formula 10 prepared in Synthesis Example is added thereto and dissolved therein at 30° C. Subsequently, 0.000075 mol (0.0270 g) of bis-APAF is added to the solution and completely dissolved therein. Then, 0.0074 mol (2.1684 g) of 3,3',4,4'-biphenyltetracarboxylic dianhydride (BPDA) and 0.0074 mol (3.2741 g) of 4,4' hexafluoroisopropylidene diphthalic anhydride (6FDA)

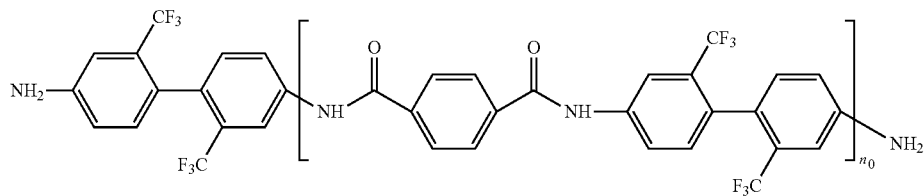

Chemical Formula 10

In Chemical Formula 10, $n_0$ is an integer of 0 or more.

Comparative Example 1: Manufacture of Poly(Imide-Amide) Copolymer Film without Bis-APAF 120 g of N,N-dimethyl acetamide (DMAc) is placed in a reactor under a nitrogen atmosphere, and 0.0146 mol (20.19 g) of the amide group-containing oligomer represented by Chemical Formula 10 according to Synthesis Example is added thereto and completely dissolved therein at 30° C. Then, 0.0073 mol (2.15 g) of 3,3',4,4'-biphenyltetracarboxylic dianhydride (BPDA) and 0.0073 mol (3.25 g) of 4,4' hexafluoroisopropylidene diphthalic anhydride (6FDA) are added to the solution and dissolved therein. Subsequently, are added thereto and dissolved therein. Subsequently, N,N-dimethyl acetamide (DMAc) is added thereto, such that the total solid content becomes 16 wt %, and reacted therewith, to prepare a poly(amic acid-amide) copolymer.

When the reaction is complete, 0.0441 mol of acetic anhydride is added thereto, the mixture is stirred for 30 minutes, the same number of moles of pyridine is added thereto, and the obtained mixture is further stirred at 30° C. for 36 hours to carry out a chemical imidization. After the chemical imidization, the product is precipitated from the resulting solution to form a powder. The powder is vacuum-dried at 120° C. for 24 hours and redissolved in N,N-dimethyl acetamide, to prepare a poly(imide-amide) copolymer solution.

The prepared poly(imide-amide) copolymer solution is used to form a film on a glass plate by using a doctor blade. The film is pre-baked on an 80° C. hot plate for one hour, heated up to 250° C. at 3° C./min in a furnace, and then, dried and thermally imidized.

Examples 2 to 5: Manufacture of
Poly(Imide-Amide) Copolymer Film Including
Bis-APAF Each poly(imide-amide) copolymer film according to Examples 2 to 5 is manufactured by using the same material and method as in Example 1, except for using the compound represented by Chemical Formula 10 prepared in Synthesis Example and bis-APAF as a diamine moiety, wherein the bis-APAF is used respectively in an amount of 1.0 mol %, 2.0 mol %, 3.0 mol %, and 7.0 mol %, based on the total amount of the amide group-containing oligomer and the bis-APAF.

Evaluation 1: Adherence Test of Films

Adherence of the films according to Comparative Example 1 and Examples 1 to 3 is tested. The adherence test is performed as follows.

First of all, the film according to each Example is cut into two pieces having a size of 150 mm×25 mm (mm=millimeter), and a PSA adhesive, 3M8126, made by 3M, is applied to be 50 micrometers (μm) thick over the length of 110 mm out of the entire length of 150 mm except for the end of 40 mm on one of the films. Then, the other film is overlapped on the film applied with the adhesive and bonded, while the end of 40 mm is left. The bonded film is maintained at room temperature for 24 hours and completely dried, and Instron3365 made by Instron in a 180° peel test mode is used.

Specifically, the front parts of the films, to which the adhesive 2 is not applied, in two sheets of the films 1 bonded by the adhesive are vertically separated at the front end of the tester and elongated in two opposite directions (refer to FIG. 1). In other words, the front part of the bottom film to which the adhesive is not applied is vertically down fixed, and the front part of the top film to which the adhesive is not applied is vertically pulled up to perform an adherence test. The adherence test measures adherence between the films and the adhesive in a method of measuring strength consumed per a tensile length. The films according to the Examples and Comparative Example 1 are respectively tested four times in total, and their average values are shown depending on a film peeling length (a tensile length) in Table 1.

TABLE 1

| Peeling length | Load/width (gram force/25 mm) | | | |
|---|---|---|---|---|
| | Comparative Example 1 | Example 1 | Example 2 | Example 3 |
| 50 mm | 617 | 721 | 876 | 790 |
| 70 mm | 444 | 689 | 844 | 750 |
| 90 mm | 361 | 507 | 846 | 742 |

Referring to the result of Table 1, the films including 0.5 mol % to 2.0 mol % of the bis-APAF according to Examples 1 to 3 consume much more strength compared with the film including no bis-APAF according to Comparative Example 1, when the film is peeled off up to 50 mm, 70 mm, and 90 mm long. In other words, the film including the bis-APAF shows increased adherence compared with the film including no bis-APAF.

Figure 2:
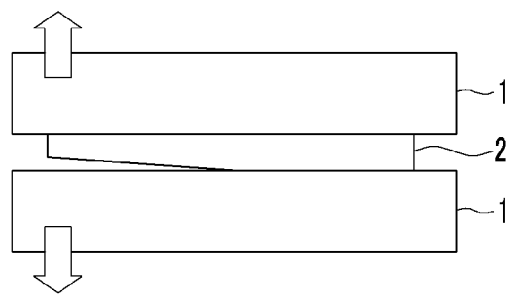
FIG. 2 is a view schematically showing peeling on the interface of the adhesive (PSA) 2 and the film 1 when peeling a sheet of the films 1.

In addition, the film according to Comparative Example 1 shows sharply deteriorated adherence when peeled off up to 70 mm and 90 mm long compared to when the film is peeled off up to 50 mm long. The reason is that adherence on the interface between the adhesive 2 and the film 1 is weak and destroyed even by pulling and peeling the end of the film when the pulling and peeling continues for a predetermined time. FIG. 2 is a view schematically showing the adhesive and the film.

Figure 3:
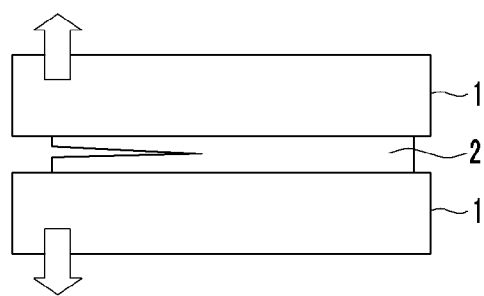
FIG. 3 is a view schematically showing that two sheets of films 1 of Example 2 are not peeled off on their interface with the adhesive (PSA) 2 but peeled off while the adhesive (PSA) 2 applied and dried between them is internally broken.

On the contrary, as shown in Table 1, the films according to Examples 1 to 3 maintain uniform adherence to a degree when respectively peeled off 50 mm, 70 mm, and 90 mm long, and in particular, the films including the bis-APAF respectively in an amount of 1.0 mol % and 2.0 mol % according to Examples 2 and 3 maintain almost equivalent adherence even when their tensile lengths are increased. The reason is that two sheets of films maintain a uniform bond when bonded through an adhesive, and accordingly, the adherence between the film 1 and the adhesive 2 is not destroyed on the interface of the film with the adhesive, but the film is delaminated by internal fracture of the adhesive during the peeling. FIG. 3 is a view schematically showing the adhesive and the film.

Figure 4:
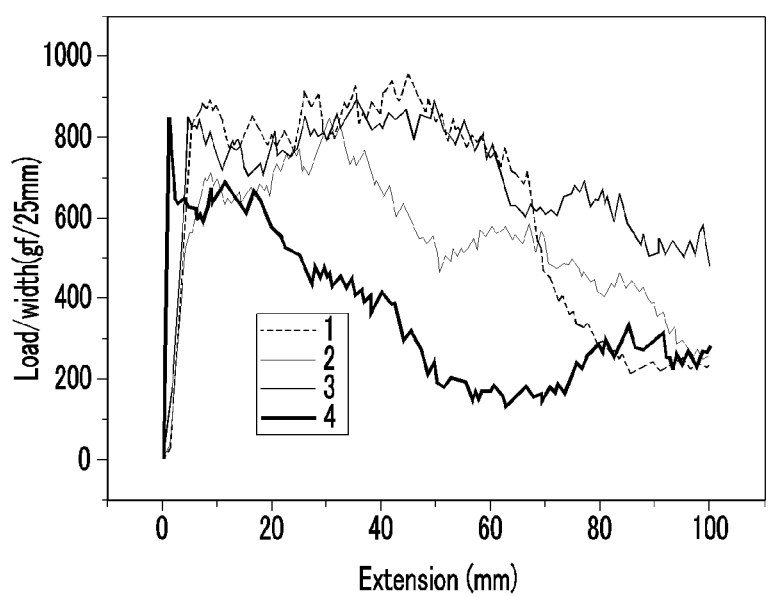
FIG. 4 is a graph of load to width ratio (gram force per 25 millimeters, gf/25 mm) versus extension (millimeters, mm) showing adherence changes of four pairs of films including no bis-APAF (2,2'-bis(3-amino-4-hydroxyphenyl)-hexafluoropropane) according to Comparative Example 1 depending on a peeling length.

FIG. 4 is a graph showing adherence changes of four pairs of the films according to Comparative Example 1 depending on a peeling length.

Referring to FIG. 4, when a film including no bis-APAF is greater than or equal to 20 mm peeled off, adherence is sharply deteriorated. In other words, when greater than or equal to 20 mm peeled off, the film may be easily delaminated on the interface with the adhesive.

Figure 5:
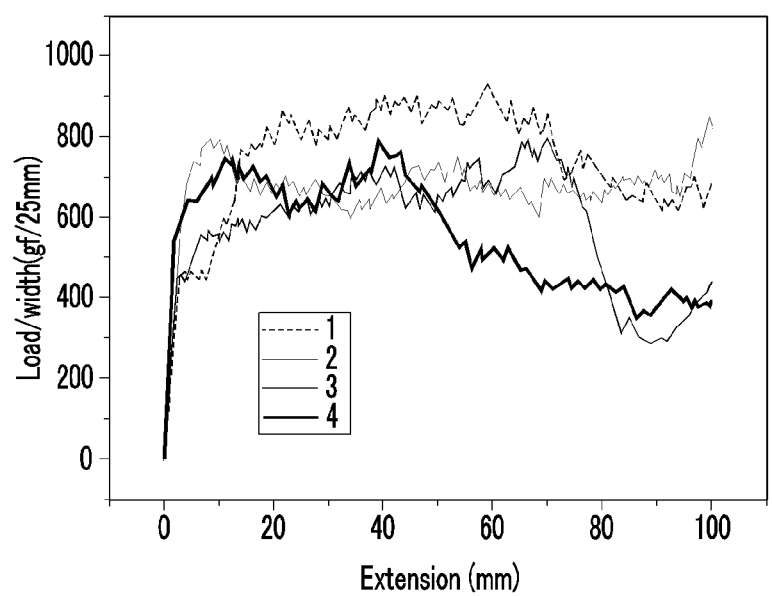
FIG. 5 is a graph of load to width ratio (gram force per 25 millimeters, gf/25 mm) versus extension (millimeters, mm) showing adherence changes of four pairs of films including 0.5 mol % of bis-APAF according to Example 1 depending on a peeling length.

FIG. 5 is a graph showing adherence changes of four pairs of the films including 0.5 mol % of the bis-APAF according to Example 1 depending on a peeling length.

When the bis-APAF is included in an amount of 0.5 mol %, adherence of Example 1 is slightly decreased compared with Example 2 or 3 but is uniformly maintained to a degree when the film is peeled off up to at least 40 mm long and has a higher absolute value than that of Comparative Example 1.

Figure 6:
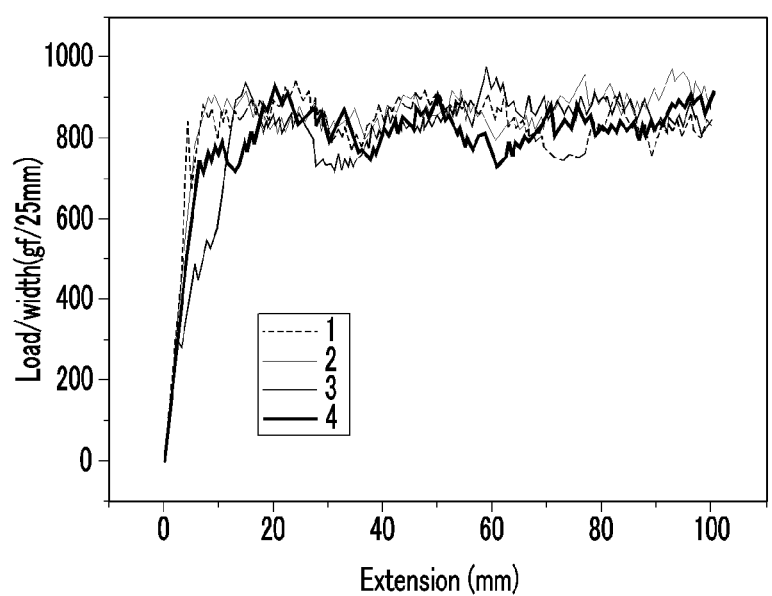
FIG. 6 is a graph of load to width ratio (gram force per 25 millimeters, gf/25 mm) versus extension (millimeters, mm) showing adherence changes of four pairs of films including 1.0 mol % of bis-APAF according to Example 2 depending on a peeling length.

FIG. 6 is a graph showing adherence changes of four pairs of the films including 1.0 mol % of the bis-APAF according to Example 2 depending on a peeling length.

When the bis-APAF is included in an amount of 1.0 mol %, the highest adherence and the most uniform adherence are shown. Even when the film is extensively peeled off up to 100 mm long, the film maintains almost the same adherence, and all four pairs of the films have almost the same absolute value of adherence to one another. In other words, when the bis-APAF is included in an amount of 1.0 mol % based on the total amount of the diamine, the most excellent adherence is shown.

Figure 7:
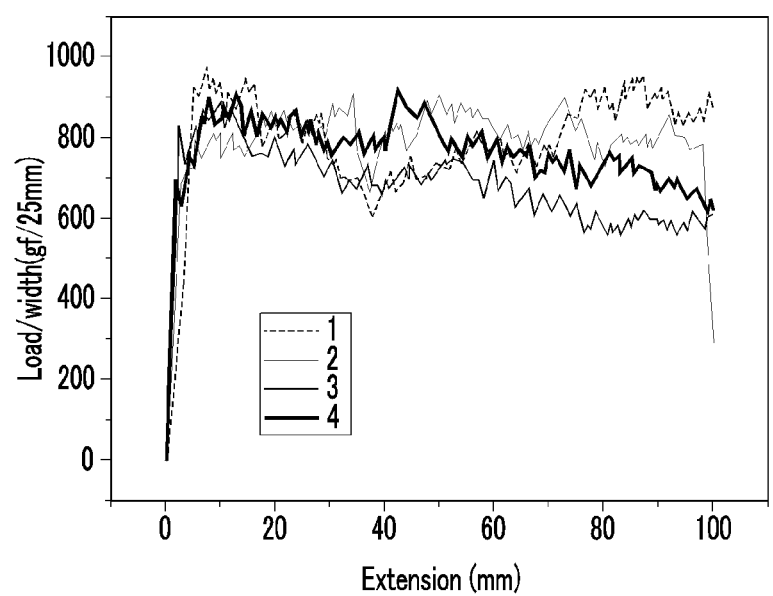
FIG. 7 is a graph showing adherence changes of four pairs of films including 2.0 mol % of bis-APAF according to Example 3 depending on a peeling length.

FIG. 7 is a graph showing adherence changes of four pairs of the films including 2.0 mol % of the bis-APAF according to Example 3, depending on a peeling length.

When the bis-APAF is included in an amount of 2.0 mol %, the film of Example 3 shows a little decreased adherence compared with the film of Example 2 but maintains remarkably high adherence compared with that of Example 1 or Comparative Example 1, and when the film is peeled off up to about 70 mm, adherence is uniformly maintained. In addition, four pairs of the films show uniformly high adherence to a degree.

Evaluation 2: Optical Properties and Mechanical Characteristics of Films

The optical properties and mechanical characteristics of the films including 0.5 mol % to 7.0 mol % of the bis-APAF as a diamine component according to Examples 1 to 5 and the film without bis-APAF according to Comparative Example 1 are evaluated, and the results are shown in Table 2.

In Table 2, each measurement value is measured as follows:

[1] Thickness Measurement

The thickness is measured using a micrometer (manufactured by Mitutoyo).

[2] Modulus

With an Instron 3365 device, a film sample having a width of 10 mm and a length of 50 mm is drawn at a speed of 0.5 mm/mm/min at room temperature, and each sample is measured 5 times according to an ASTM D882 method and averaged.

[3] Yellowness Index (YI)

The yellowness index is measured by using UV Spectrophotometer (KONICA MINOLTA, cm-3600d) according to ASTM E313.

[4] Haze

The haze is measured according to ASTM E313.

[5] Pencil Hardness

Pencil scratch hardness is measured using a pencil hardness measurer and a Mitsubishi pencil according to the ASTM D3363 standard. Specifically, a film is held on a glass plate having a thickness of 2 mm and measured 5 times in each 10 mm with a vertical load of 1 kilogram (kg) at a pencil speed of 60 millimeters per minute (mm/min), and then the highest hardness when it is not scratched is determined.

TABLE 2

| | Amount of Bis-APAF (mol %) | Thickness (μm) | Modulus (GPa) | YI (@ 50 μm) | Haze | Pencil hardness |
|---|---|---|---|---|---|---|
| Comparative Example 1 | 0 | 49 | 6.6 | 2.6 | 1.0 | F |
| Example 1 | 0.5 | 52 | 6.2 | 2.6 | 1.3 | HB-F |
| Example 2 | 1.0 | 55 | 6.1 | 2.8 | 1.2 | HB |
| Example 3 | 2.0 | 55 | 6.4 | 2.7 | 0.9 | F |
| Example 4 | 3.0 | 56 | 6.2 | 3.3 | 1.1 | — |
| Example 5 | 7.0 | 56 | 6.3 | 3.2 | 1.2 | — |

As shown in Table 2, the films including 0.5 mol % to 7.0 mol % of the bis-APAF according to Examples 1 to 5 have high mechanical strength (modulus of 6.0 or greater) and high optical properties (YI of less than or equal to 3.5). The results show that the optical properties and mechanical strength of films including a small amount of bis-APAF is not largely deteriorated compared with the film without bis-APAF according to Comparative Example 1.

That is, the poly(imide-amide) copolymer including 10 mol % or less of bis-APAF according to an embodiment may improve adherence with adhesives, without decrease of optical properties and mechanical characteristics, and thus may be advantageously used for manufacture a flexible device and the like.

Evaluation 3: Hygroscopicity of Films

Hygroscopicity change of the film including 1 mol % of bis-APAF is examined compared with the film without bis-APAF.

That is, each film according to Comparative Example 1 and Example 2 is allowed to stand at 60° C., under a condition of relative humidity of 93% for 24 hours, and each film is treated at 150° C. for 30 minutes to measure weight changes (TGA). As a result, the films according to Comparative Example 1 and Example 2 show the same TGA changes of about 2.3%. That is, there is no hygroscopicity change due to presence of bis-APAF.

While this disclosure has been described in connection with what is presently considered to be practical exemplary embodiments, it is to be understood that the disclosure is not limited to the present embodiments, but, on the contrary, is intended to cover various modifications and equivalent arrangements included within the spirit and scope of the appended claims.

What is claimed is:

1. A poly(imide-amide) copolymer comprising:
   an imide structural unit which is a reaction product of a first diamine and a dianhydride, and
   an amide structural unit which is a reaction product of a second diamine and a diacyl halide,
   wherein each of the first diamine and the second diamine comprises 2,2'-bis-trifluoromethyl-4,4'-biphenyldiamine,
   wherein at least one of the first diamine and the second diamine further comprises a compound represented by Chemical Formula 1,
   wherein the dianhydride is a mixture of 3,3',4,4'-biphenyltetracarboxylic dianhydride and 4,4'-hexafluoroisopropylidene diphthalic anhydride,
   wherein the diacyl halide comprises terephthaloyl chloride, and
   wherein the amount of the compound represented by Chemical Formula 1 is greater than 0 mole percent and less than or equal to about 10 mole percent based on the total moles of the first diamine and the second diamine:

NH$_2$-A-NH$_2$     Chemical Formula 1 wherein, in Chemical Formula 1,
A is represented by the following chemical formula:

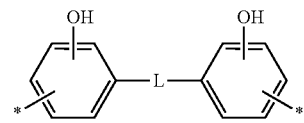

wherein, in the chemical formula,
L is a single bond or a linking group selected from —C(=O)—, —S(=O)$_2$—, and —CRR'— (wherein, R and R' are the same or different, and are independently a C1 to C4 alkyl group substituted with at least one fluorine atom), and
* is a portion linked to a nitrogen atom.

2. The poly(imide-amide) copolymer of claim 1, wherein A is represented by Chemical Formula 2 or Chemical Formula 3:

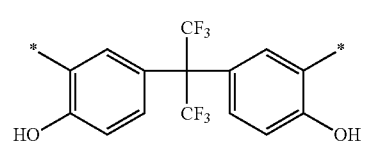

Chemical Formula 2

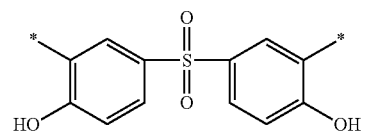

Chemical Formula 3 wherein, in Chemical Formulae 2 and 3,

\* is a portion linked to a nitrogen atom.

3. The poly(imide-amide) copolymer of claim 1, wherein the amount of the diamine represented by Chemical Formula 1 is about 0.1 mole percent to about 8.0 mole percent based on the total moles of the first diamine and the second diamine of the poly(imide-amide) copolymer.

4. The poly(imide-amide) copolymer of claim 1, wherein the mole ratio of the imide structural unit and the amide structural unit is about 0.2 to 0.8:about 0.8 to 0.2.

5. The poly(imide-amide) copolymer of claim 1, wherein the mole ratio of the imide structural unit and the amide structural unit is about 0.2 to 0.4:about 0.8 to 0.6.

6. The poly(imide-amide) copolymer of claim 1, wherein the poly(imide-amide) copolymer comprises:

(i) a structural unit represented by Chemical Formula 4, (ii) a structural unit represented by Chemical Formula 5, (iii) a structural unit represented by Chemical Formula 6, and (iv) at least one of a structural unit represented by Chemical Formula 7, a structural unit represented by Chemical Formula 8, and a structural unit represented by Chemical Formula 9, wherein the total amount of the (iv) at least one of the structural unit represented by Chemical Formula 7, the structural unit represented by Chemical Formula 8, and the structural unit represented by Chemical Formula 9 is less than or equal to about 10 mole percent based on the total moles of the structural units (i) to (iv):

Chemical Formula 4

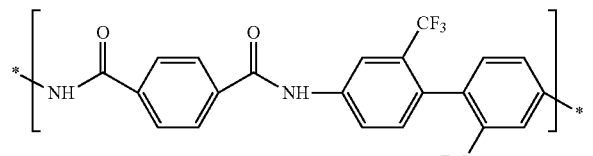

Chemical Formula 5

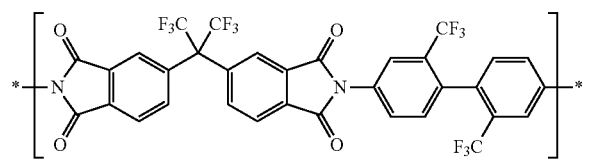

Chemical Formula 6

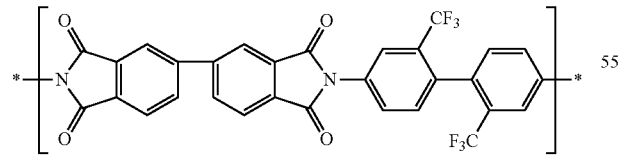

Chemical Formula 7

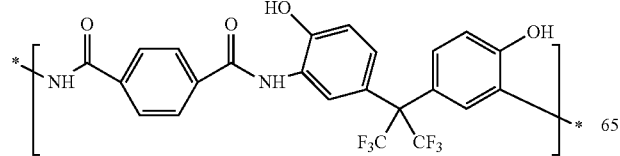

Chemical Formula 8

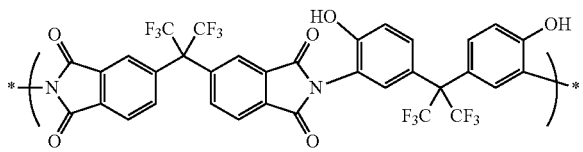

Chemical Formula 9

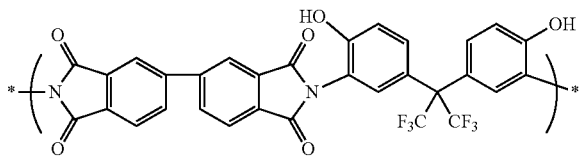

wherein, in Chemical Formulae 4 to 9,

\* is a portion linked to a nitrogen atom or a carbon atom.

7. The poly(imide-amide) copolymer of claim 6, wherein the poly(imide-amide) copolymer comprises:

(i) the structural unit represented by Chemical Formula 4, (ii) the structural unit represented by Chemical Formula 5, (iii) the structural unit represented by Chemical Formula 6, and (iv) at least one of the structural unit represented by Chemical Formula 8 and the structural unit represented by Chemical Formula 9, wherein the total amount of the (iv) at least one of the structural unit represented by Chemical Formula 8 and the structural unit represented by Chemical Formula 9 is about 0.1 mol % to about 8.0 mol % based on the total moles of the structural units (i) to (iv).

8. An article comprising the poly(imide-amide) copolymer of claim 1.

9. The article of claim 8, wherein the article is a film, and wherein the film has a yellowness index of less than or equal to 3.5 and a tensile modulus of greater than or equal to 4.0 gigapascals at a thickness of about 50 micrometers to about 100 micrometers.

10. An electronic device comprising the article of claim 8.

11. A poly(imide-amide) copolymer comprising:

a reaction product of a compound represented by Chemical Formula 10, a diamine represented by Chemical Formula 1, and a dianhydride mixture comprising 3,3',4,4'-biphenyltetracarboxylic dianhydride and 4,4'-hexafluoroisopropylidene diphthalic anhydride, wherein the amount of the diamine represented by Chemical Formula 1 is greater than 0 mole percent and less than or equal to about 10 mole percent based on the total moles of the diamines used in the reaction:

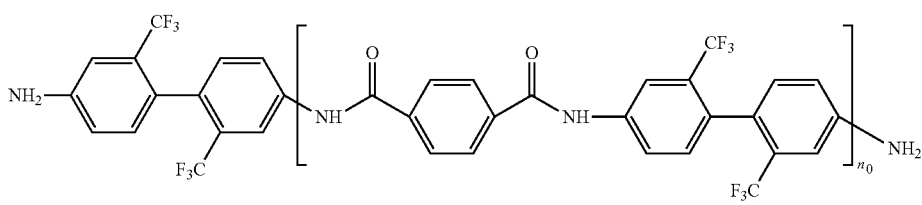

Chemical Formula 10 wherein, in Chemical Formula 10, $n_0$ is an integer of 1 or more, $NH_2$-A-$NH_2$  Chemical Formula 1 wherein, in Chemical Formula 1,
A is represented by the following chemical formula:

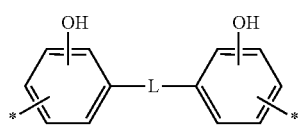

wherein, in the chemical formula,
L is a single bond or a linking group selected from —C(=O)—, —S(=O)$_2$—, and —CRR'— (wherein, R and R' are the same or different, and are independently a C1 to C4 alkyl group substituted with at least one fluorine), and
* is a portion linked to a nitrogen atom.

12. The poly(imide-amide) copolymer of claim 11, wherein A is represented by Chemical Formula 2 or Chemical Formula 3:

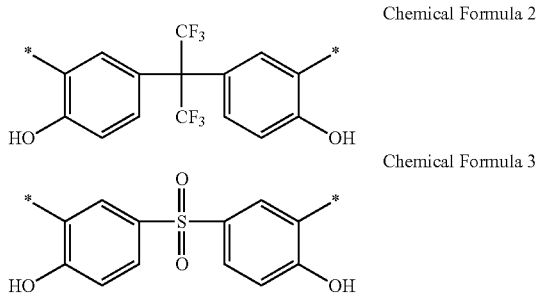

Chemical Formula 2

Chemical Formula 3 wherein, in Chemical Formulae 2 and 3,
* is a portion linked to a nitrogen atom.

13. A method of preparing a poly(imide-amide) copolymer comprising:

reacting 2,2'-bis-trifluoromethyl-4,4'-biphenyldiamine with terephthaloyl chloride to prepare a compound represented by Chemical Formula 10, and reacting the prepared compound of Chemical Formula 10 with a diamine represented by Chemical Formula 1, and a mixture of 3,3',4,4'-biphenyltetracarboxylic dianhydride, and 4,4'-hexafluoroisopropylidene diphthalic anhydride to prepare a poly(amic acid-amide) copolymer, and imidizing the obtained poly(amic acid-amide) copolymer to prepare the poly(imide-amide) copolymer:

Chemical Formula 10

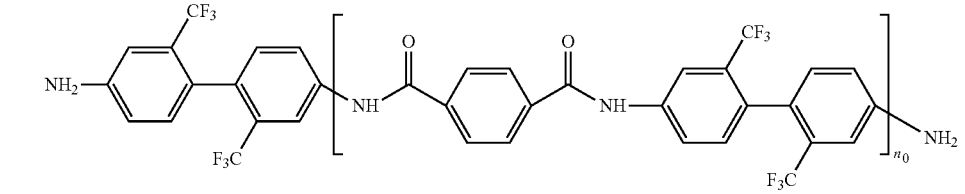

wherein, in Chemical Formula 10, $n_0$ is an integer of 1 or more, $NH_2$-A-$NH_2$  Chemical Formula 1 wherein, in Chemical Formula 1,
A is represented by the following chemical formula:

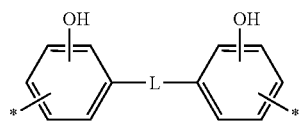

wherein, in the chemical formula,
L is a single bond or a linking group selected from —C(=O)—, —S(=O)$_2$—, and —CRR'— (wherein, R and R' are the same or different, and are independently a C1 to C4 alkyl group substituted with at least one fluorine atom), and
* is a portion linked to a nitrogen atom.

14. The method of claim 13, wherein the amount of the diamine represented by Chemical Formula 1 is greater than 0 mole percent and less than or equal to about 10 mole percent based on the total moles of 2,2'-bis-trifluoromethyl-4,4'-biphenyldiamine and the diamine represented by Chemical Formula 1.

15. The method of claim 13, wherein A is represented by Chemical Formula 2 or Chemical Formula 3:
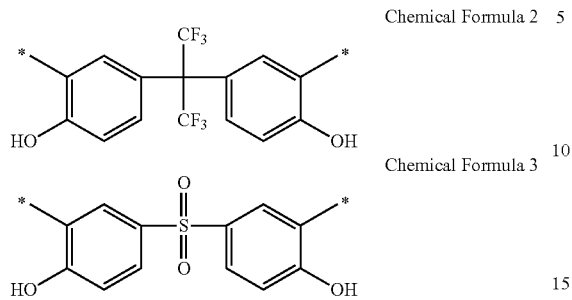
Chemical Formula 2
Chemical Formula 3
wherein, in Chemical Formulae 2 and 3,
* is a portion linked to a nitrogen atom.
16. The method of claim 13, wherein the imidizing comprises chemical imidization, thermal imidization, or a combination thereof.
* * * * *